UNITED STATES PATENT OFFICE.

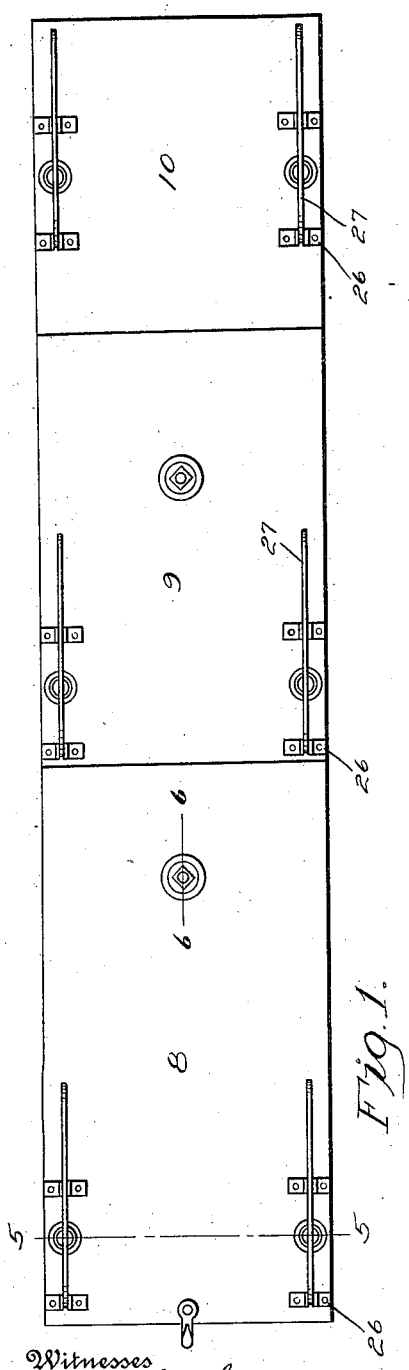
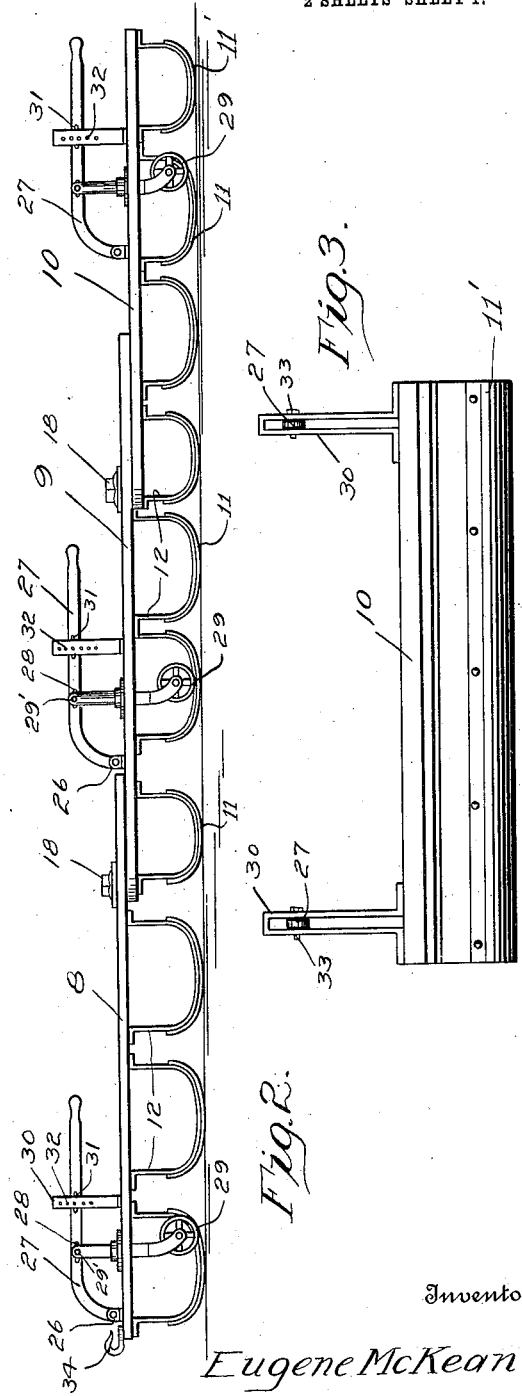

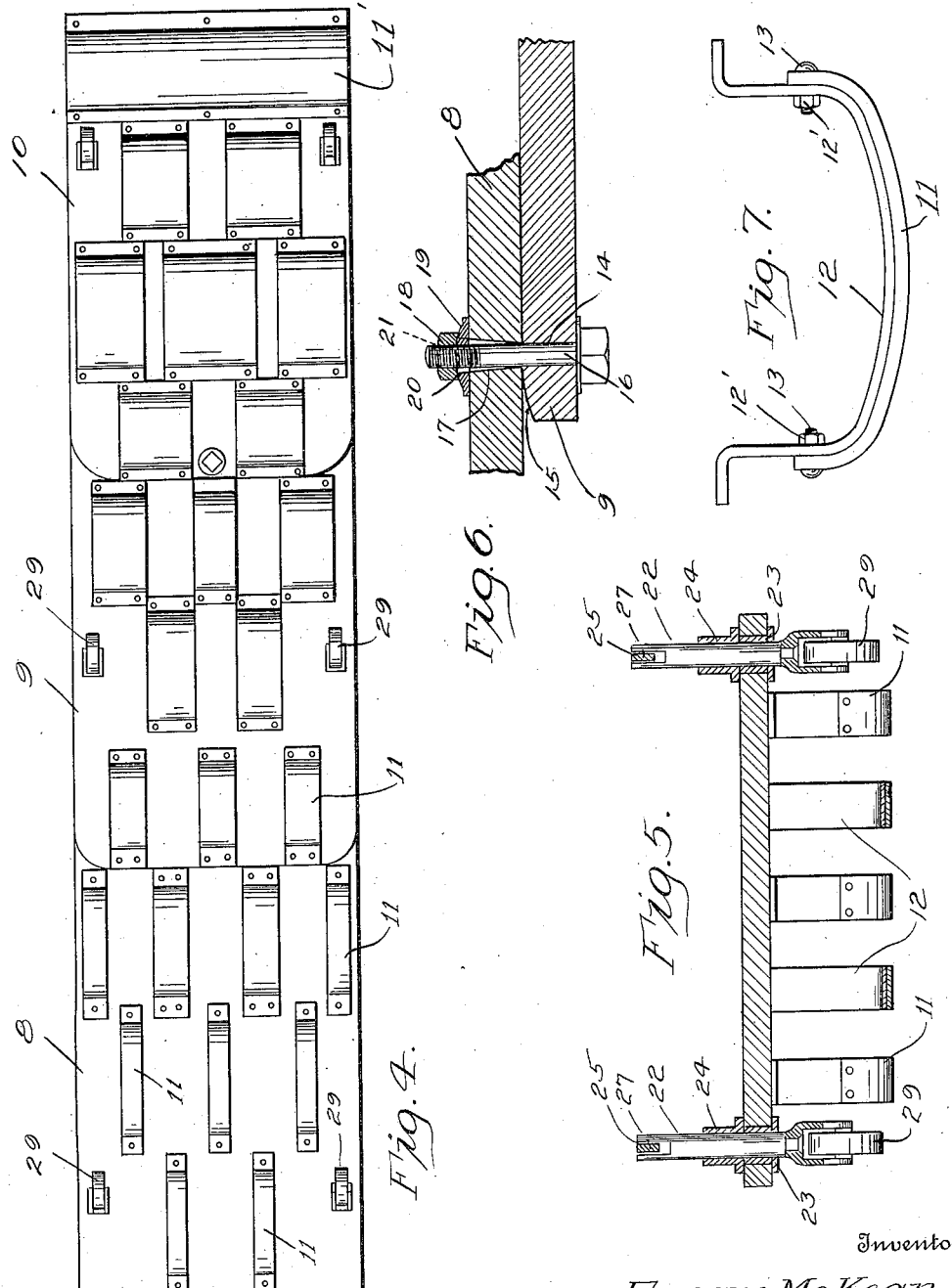

EUGENE McKEAN, OF OAKLAND, CALIFORNIA.

ROAD-SMOOTHER.

1,092,280. Specification of Letters Patent. Patented Apr. 7, 1914.

Application filed July 17, 1912. Serial No. 710,102.

*To all whom it may concern:*

Be it known that I, EUGENE McKEAN, citizen of the United States, residing at Oakland, in the county of Alameda and State of California, have invented certain new and useful Improvements in Road-Smoothers, of which the following is a specification.

My present invention relates to apparatus adapted to render road surface free from roughness—so annoying and detrimental to travel—and is particularly adapted for use upon roads which have been treated with heavy oil.

The principal objects of my invention are, to provide an apparatus which is flexible, to permit it to follow the course of the road, and to conform to convex portions of great magnitude longitudinally of the road, such as are necessary for grading and drainage, but not to accommodate itself to concave portions or depressions longitudinally of the road, such as result from washouts or sinking of the foundation.

Further objects of my invention are to provide an apparatus with sections which may be coupled or uncoupled, whereby the apparatus may be lengthened or shortened, to best adapt it for use according to the condition of the road to be worked.

In the drawings, forming a part of this specification:—Figure 1 is a top plan view of an apparatus embodying my invention. Fig. 2 is a side elevation of the same. Fig. 3 is an enlarged rear elevation of the apparatus. Fig. 4 is a bottom plan view of the apparatus as disclosed in Fig. 1. Fig. 5 is a cross sectional view on the line 5—5 of Fig. 1. Fig. 6 is an enlarged detailed sectional view on the line 6—6 of Fig. 1. Fig. 7 is an enlarged view in side elevation of what I hereinafter term spreader, together with its supporting frame.

Similar characters refer to similar parts throughout the several views.

A plurality of horizontally disposed frame members 8, 9 and 10, are provided, constructed or formed in any suitable manner, and preferably overlapped or disposed with each rear end of the forward frame superjacent to the forward end of the succeeding frame, as clearly shown in Figs. 2 and 6 of the drawing, the frame 8 being foremost in the direction of travel of the apparatus. Any practical number of frames may be coupled together, three being shown by way of example, so that they may swing laterally with respect to one another to follow the course of the road, as hereinafter described.

Each frame carries a plurality of series of U-shaped spreaders, 11, carried by frame bars 12, secured to and depending from the frames. The spreaders are detachably secured to the frame bars 12, as by nuts 12′ and bolts 13, so that they may be replaced when worn. With particular reference to Fig. 4 of the drawing, it will be noted that the spreaders 11 have working surfaces of greater area as they are disposed toward the rear of the apparatus, that is, the series of spreaders at the front of the apparatus are relatively narrower than those of the series toward the rear, and the several spreaders of the series are arranged out of axial alinement with those in advance, so that as the apparatus is drawn over the road surface the tendency of the spreaders is to flatten uneven places or distribute lumps by the pressure and lateral displacement of the substance encountered. The last spreader, designated 11′, preferably extends the entire width of the apparatus.

In order to permit the apparatus to follow the course of the road, the frames may be pivoted together as disclosed in Fig. 6 of the drawing, showing the joint between frames 8 and 9. This joint permits the two sections it joins to swing upwardly with respect to a plane comprehended between the farthermost ends thereof, but not below said plane. As before stated, these frames overlap, and whether the forward or rearward frames be uppermost, is not material in so far as operation of the apparatus is concerned. The lowermost frame, that designated 9, is provided with an aperture 14 adjacent its transverse margin and has its upper surface, adjacent the uppermost frame, rounded at such margin, as at 15. The aperture 14 is of a size to accommodate bolt 16, while such bolt passes upwardly through an enlarged aperture 17 in the upper frame, that designated 8, disposed somewhat remote from the transverse margin thereof. The upper threaded end of bolt 16 receives a nut 18, with a washer 19 interposed between such nut and the frame provided with the enlarged aperture. Washer 19 is provided with a spherical segment portion 20, while the inner face 21 of nut 18 is hollowed out complementary to such portion 20, whereby the one frame may swing with respect to the other frame, to permit the apparatus, as a whole, to accommodate itself to convex portions of great magnitude in the road surface, but is retained so as not to conform to depressions in the road. This retaining of the frame is accomplished by the upper frame portion beyond the nut and bolt 16 and 18, respectively, binding against the lower frame, but upward movement of the frame members is permitted because of the rounded portions 15 on the lower frame, the shape of aperture 17, and the coacting engagement of nut 18 and washer 19.

To facilitate transportation of the apparatus and gaging of the pressure of the spreader upon the road surface, a plurality of casters or wheels 29 are provided, carried by the several frames, and adjustable vertically with respect thereto. Each caster is preferably carried by a stem 22, to which it is pivoted, this stem passing through and guided by sleeves 23 and 24, carried by the frames, as clearly shown in Fig. 5 of the drawing.

The upper portion of each stem 22 is bifurcated as at 25, and pivoted to a bracket 26, mounted on the frame, is a lever 27 to control movement of said stem. This lever 27 is slotted at 28, at a portion passing through bifurcations 25, a pin 29 being passed through said slot and carried by the bifurcations, so that the stem may be raised or lowered by the lever. A guide 30 is provided through which the lever moves, the lever having a second slot 31, and the guide, a plurality of apertures 32, permitting a pin 33 to be carried by the guide, passing through slot 31 to retain the lever stationary, but in various desired positions.

A clevis 34 may be secured to frame 8 to facilitate drawing of the apparatus.

From the foregoing it is made manifest that I provide a road surfacer, which is adapted to act upon rough portions of the road surface to smooth the same, but displacing and compressing the material encountered; that the apparatus may be drawn to follow the course of the road; that the pressure upon the road surface with which the spreaders work, may be gaged, or the apparatus transported without further contact with the road surface, and, that the apparatus may conform to the road surface to best adapt the same for successful operation thereupon.

I claim:—

1. A road surfacer comprising in combination, a supporting frame, and a plurality of spreaders carried thereby, said spreaders having working surfaces of greater area as they approach the rear of the apparatus, substantially as and for the purpose set forth.

2. A road surfacer comprising in combination, a horizontally disposed supporting frame, and a plurality of spreaders stationarily carried thereby in series transversely disposed of the frame, said spreaders having working surfaces of greater area as they approach the rear of the apparatus, and the spreaders of each series being out of actual alinement with those in advance thereof, substantially as and for the purpose set forth.

3. In a road surfacer, the combination of a horizontally disposed supporting frame, means carried by said frame for contact with the road surface to work the same, a plurality of casters, and mechanism carried by said frame for adjusting the position of any of said casters relative to said means, forth.

4. In a road surfacer, the combination of a plurality of horizontally disposed frame members, surfacing means carried by said frame members for contact with the road surface to work the same, and mechanism for connecting the said frame members together to move upwardly with respect to a plane comprehended between their farthermost ends, but not below said plane, substantially as and for the purpose set forth.

5. In a road surfacer, the combination of a plurality of horizontally disposed frame members, surfacing means carried by each of said frame members for contact with the road surface to work the same, and mechanism for connecting said frame members together, to swing laterally with respect to one another and to move upwardly with respect to a plane comprehended between their farthermost ends, but not below said plane, substantially as and for the purpose set forth.

6. In a road surfacer, the combination of a plurality of horizontally disposed frame members, surfacing means carried by each of said frame members for contact with the road surface to work the same, said frame members being disposed in overlapping relation to each other and having apertures, the lowermost frame member having its transverse margin adjacent the upper member rounded, a bolt passing through one of the apertures of said frame members, the other aperture being relatively larger than the said aperture, a nut for said bolt, and a washer interposed between said nut and the said frame member having the larger aperture, the washer and nut having complementary surface portions permitting movement of the washer with respect to the bolt, substantially as and for the purpose set forth.

In testimony whereof I affix my signature in presence of two witnesses.

EUGENE McKEAN.

Witnesses:
M. M. ESCHERICH,
F. P. SCHROEDER.

Copies of this patent may be obtained for five cents each, by addressing the "Commissioner of Patents, Washington, D. C."